US010085284B2

United States Patent
Chien et al.

(10) Patent No.: US 10,085,284 B2
(45) Date of Patent: Sep. 25, 2018

(54) BASE STATION, USER EQUIPMENT, TRANSMISSION CONTROL METHOD FOR THE BASE STATION AND DATA TRANSMISSION METHOD FOR THE USER EQUIPMENT

(71) Applicant: Institute For Information Industry, Taipei (TW)

(72) Inventors: Chun-Che Chien, Taipei (TW); Chiu-Wen Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 192 days.

(21) Appl. No.: 15/091,567

(22) Filed: Apr. 5, 2016

(65) Prior Publication Data

US 2016/0302231 A1    Oct. 13, 2016

Related U.S. Application Data

(60) Provisional application No. 62/144,345, filed on Apr. 8, 2015.

(51) Int. Cl.
*H04W 74/08* (2009.01)
*H04W 74/00* (2009.01)
*H04W 72/04* (2009.01)

(52) U.S. Cl.
CPC ..... *H04W 74/0816* (2013.01); *H04W 72/042* (2013.01); *H04W 74/006* (2013.01)

(58) Field of Classification Search
CPC ........... H04W 74/0816; H04W 72/042; H04W 74/006
See application file for complete search history.

(56) References Cited

U.S. PATENT DOCUMENTS

| 9,629,160 | B1 * | 4/2017 | Sevindik | H04W 72/0453 |
| 2002/0122409 | A1 * | 9/2002 | Kandala | H04W 72/12 |
| | | | | 370/348 |
| 2010/0150116 | A1 * | 6/2010 | Ji | H04W 74/0875 |
| | | | | 370/338 |
| 2010/0272019 | A1 * | 10/2010 | Papasakellariou | H04B 7/0417 |
| | | | | 370/328 |

(Continued)

FOREIGN PATENT DOCUMENTS

WO    WO 2015113645 A1 *    8/2015    ........... H04W 72/02

*Primary Examiner* — Maharishi V Khirodhar
*Assistant Examiner* — Kenneth P Hunt
(74) *Attorney, Agent, or Firm* — Skaar Ulbrich Macari, P.A.

(57) ABSTRACT

A base station (BS), a user equipment (UE), a transmission control method for the BS and a data transmission method for the UE are provided. Based on user group information, the base station transmits uplink transmission control information to a plurality of the UEs in a group to make each UE contend for a plurality of subframes in the allocated unlicensed band radio resource pool. If a UE successfully contends for a subframe, the UE transmits a reservation signal and transmits an uplink data signal in the contended subframe. If the UE detects another reservation signal when contending for the subframe, the UE determines whether the another reservation signal is associated with the ID of its group. If associated, the UE transmits the uplink data signal in the subframe.

22 Claims, 14 Drawing Sheets

(56) References Cited

U.S. PATENT DOCUMENTS

| | | | |
|---|---|---|---|
| 2014/0031054 A1* | 1/2014 | Zou | H04W 16/14 455/452.2 |
| 2014/0080483 A1* | 3/2014 | Elsherif | H04W 36/22 455/436 |
| 2015/0245320 A1* | 8/2015 | Chen | H04W 72/121 370/329 |
| 2016/0338042 A1* | 11/2016 | Wang | H04W 72/0406 |
| 2017/0006611 A1* | 1/2017 | Van Phan | H04W 72/005 |
| 2017/0208542 A1* | 7/2017 | Kim | H04W 52/02 |
| 2018/0110057 A1* | 4/2018 | Park | H04W 72/12 |

\* cited by examiner

BASE STATION, USER EQUIPMENT, TRANSMISSION CONTROL METHOD FOR THE BASE STATION AND DATA TRANSMISSION METHOD FOR THE USER EQUIPMENT

PRIORITY

This application claims the benefit of U.S. Provisional Application Ser. No. 62/144,345 filed on Apr. 8, 2015, which is hereby incorporated herein by reference in its entirety.

FIELD

The present invention relates to a base station, a user equipment (UE), a transmission control method for the base station and a data transmission method for the UE. In particular, the base station of the present invention groups a plurality of users together and allocates each of the users an unlicensed band radio resource pool of an unlicensed band. When the unlicensed band radio resource pools of UEs in the group have overlapped subframes therebetween, the UEs can commonly use the overlapped subframes without interfering with each other.

BACKGROUND

With the vigorous development of the wireless communication technology, more and more users are using various mobile devices (e.g., intelligent mobile phones, tablet computers or the like) to transmit data for purposes of communication and multimedia audio & video (AV) transmission or the like. To ensure that mobile communication services of superior quality are provided for users, mobile communication operators obtain licensed bands by bidding for the licensed bands.

However, because of the growing number of users and the limited licensed band radio resources, it is often the case that a base station in a particular region (e.g., a user-intensive region such as a commercial zone, a traffic hub or the like) cannot provide sufficient radio resources for users in the region at the same time, and this results in the decrease of the transmission speed. For example, in order to serve a large number of UEs at the same time, the radio resource allocated by the base station to each UE will be limited. In this case, if the user wants to transmit a relatively large volume of data (e.g., upload films or pictures having a relatively large volume of data), then the limited licensed band radio resource usually cannot satisfy the transmission demand of the user, and thus the user will feel less satisfied with the mobile communication service quality.

To solve the problem of the limited licensed band radio resource, currently specialists and operators in the fourth generation long term evolution (4G LTE) mobile communication field have proposed use of unlicensed bands to assist in the signal transmission, i.e., the Licensed Assisted Access (LAA) technology. However, the conventional base station allocates the radio resources of the unlicensed bands to UEs individually and independently.

In detail, when a user needs to transmit uplink data, the base station can allocate a radio resource of an unlicensed band in response to the transmission demand of the user. For example, the base station may allocate part of radio resources of a specific subframe on a specific carrier to a UE so that the UE contends for the subframe through the listen before talk (LBT) procedure. That is, a clear channel assessment (CCA) is performed on the subframe to determine whether the carrier is available, and after it is determined that the carrier is available, a reservation signal is transmitted to ensure that the uplink data can be subsequently transmitted.

However, if the UE fails the contention in the current LAA mechanism, then the base station needs to reschedule to allocate a new radio resource of the unlicensed band to the UE until the UE has successfully contended for the radio resource and transmitted the uplink data. These repeated and ineffective scheduling operations will cause a serious delay in the uplink data transmission and an additional burden for the base station.

Moreover, to enable the radio resource of the unlicensed band to be used by the UEs that it serves, the base station may allocate a same subframe to several UEs so that the UEs content for the same subframe at the same time. However, for the current LAA mechanism, inter-blocking might occur between the UEs. In this case, even if each UE only uses part of the radio resource of the subframe, the radio resource of the subframe still cannot be allocated to different UEs for use. In other words, when a user has successfully contended for a subframe and transmitted a reservation signal, the reservation signal will be detected by other UEs and thus the other UEs fail the contention and cannot use the subframe. Accordingly, the conventional LAA mechanism still cannot make full use of the radio resources of the unlicensed band.

Accordingly, an urgent need exists in the art to provide an uplink transmission control mechanism which can make full use of the radio resources of the unlicensed band to meet the transmission demands of the users.

SUMMARY

The disclosure includes an uplink transmission control mechanism which groups UEs together and allocates each of the UEs in the group an unlicensed band radio resource pool. In a case where the unlicensed band radio resource pools of a plurality of UEs in the group have overlapped subframes therebetween, the UEs in the group can still commonly use the overlapped subframes without inter-blocking with each other. In this way, the plurality of UEs in the group can transmit uplink data signals respectively via different radio resources of the same subframe to achieve the multiplexing transmission. Accordingly, the uplink transmission control mechanism of the present invention can not only make full use of the radio resources of the unlicensed band, but also reduce the number of times of rescheduling caused by the contention failure of the UE to avoid imposing an additional loading on the base station.

The disclosure includes a base station (BS) for a wireless communication system. The base station comprises a transceiver and a processor. The processor is electrically connected to the transceiver. The processor is configured to execute the following operations: generating first uplink transmission control information and second uplink transmission control information, the first uplink transmission control information indicating a first unlicensed band radio resource pool of an unlicensed band and the second uplink transmission control information indicating a second unlicensed band radio resource pool of the unlicensed band; and transmitting the first uplink transmission control information and the second uplink transmission control information to a first user equipment (UE) and a second UE of a user group respectively via the transceiver so that the first UE contends for a first subframe of the first unlicensed band radio resource pool according to the first uplink transmission control information and the second UE contends for a second subframe of the second unlicensed band radio resource pool according to the second uplink transmission control information. When the first UE transmits a first reservation signal after having successfully contended for the first subframe and the first subframe is the same subframe as the second subframe, the first UE transmits a first uplink data signal in the same subframe, and the second UE determines that the first reservation signal is associated with an identity (ID) of the user group so as to transmit a second uplink data signal in the same subframe. The processor further receives the first uplink data signal and the second uplink data signal in the same subframe via the transceiver.

The disclosure also includes a transmission control method for a base station. The base station is used in a wireless communication system and comprises a transceiver and a processor. The processor is electrically connected to the transceiver. The transmission control method is executed by the processor and comprises the following steps of: (a) generating first uplink transmission control information and second uplink transmission control information, the first uplink transmission control information indicating a first unlicensed band radio resource pool of an unlicensed band and the second uplink transmission control information indicating a second unlicensed band radio resource pool of the unlicensed band; (b) transmitting the first uplink transmission control information and the second uplink transmission control information to a first UE and a second UE of a user group respectively via the transceiver so that the first UE contends for a first subframe of the first unlicensed band radio resource pool according to the first uplink transmission control information and the second UE contends for a second subframe of the second unlicensed band radio resource pool according to the second uplink transmission control information; and (c) when the first UE transmits a first reservation signal after having successfully contended for the first subframe and the first subframe is the same subframe as the second subframe, receiving a first uplink data signal and a second uplink data signal in the same subframe via the transceiver. The first uplink data signal is transmitted by the first UE in the same subframe, and the second uplink data signal is transmitted by the second UE in the same subframe after determining that the first reservation signal is associated with an ID of the user group.

The disclosure further includes a UE for a wireless communication system. The UE comprises a transceiver and a processor. The processor is electrically connected to the transceiver. The processor is configured to execute the following operations: receiving uplink transmission control information from a base station via the transceiver, the uplink transmission control information indicating an unlicensed band radio resource pool of an unlicensed band; contending for a specific subframe of the unlicensed band radio resource pool via the transceiver according to the uplink transmission control information; after the contention for the specific subframe via the transceiver succeeds, transmitting a reservation signal and transmitting on the specific subframe an uplink data signal via the transceiver, the reservation signal being associated with an ID of a user group to which the UE belongs; and when the contention for the specific subframe fails and another reservation signal is detected via the transceiver, determining whether the another reservation signal is associated with the ID, and when the another reservation signal is associated with the ID, transmitting the uplink data signal on the specific subframe via the transceiver.

The disclosure additionally includes a data transmission method for a UE. The UE is used in a wireless communication system and comprises a transceiver and a processor. The processor is electrically connected to the transceiver. The data transmission method is executed by the processor and comprises the following steps of: (a) receiving uplink transmission control information from a base station via the transceiver, the uplink transmission control information indicating an unlicensed band radio resource pool of an unlicensed band; (b) contending for a specific subframe of the unlicensed band radio resource pool via the transceiver according to the uplink transmission control information; (c) after the contention for the specific subframe via the transceiver succeeds, transmitting a reservation signal and transmitting on the specific subframe an uplink data signal via the transceiver, the reservation signal is associated with an ID of a user group to which the UE belongs; and (d) when the contention for the specific subframe fails and another reservation signal is detected via the transceiver, determining whether the another reservation signal is associated with the ID, and when the another reservation signal is associated with the ID, transmitting the uplink data signal on the specific subframe via the transceiver.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments. However, these example embodiments are not intended to limit the present invention to any specific examples, embodiments, environment, applications or implementations described in these example embodiments. Therefore, description of these example embodiments is only for purpose of illustration rather than to limit the scope of the present invention. It shall be appreciated that, in the following example embodiments and the attached drawings, elements unrelated to the present invention are omitted from depiction.

Figure 1:
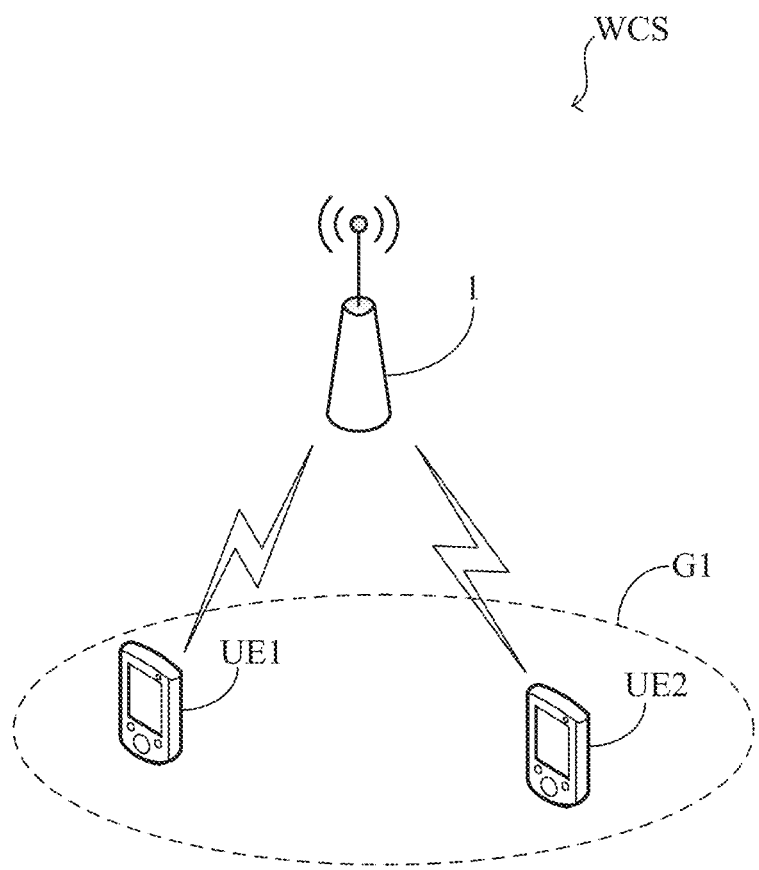
FIG. 1 is a schematic view of a wireless communication system WCS of the present invention.
Figure 2:
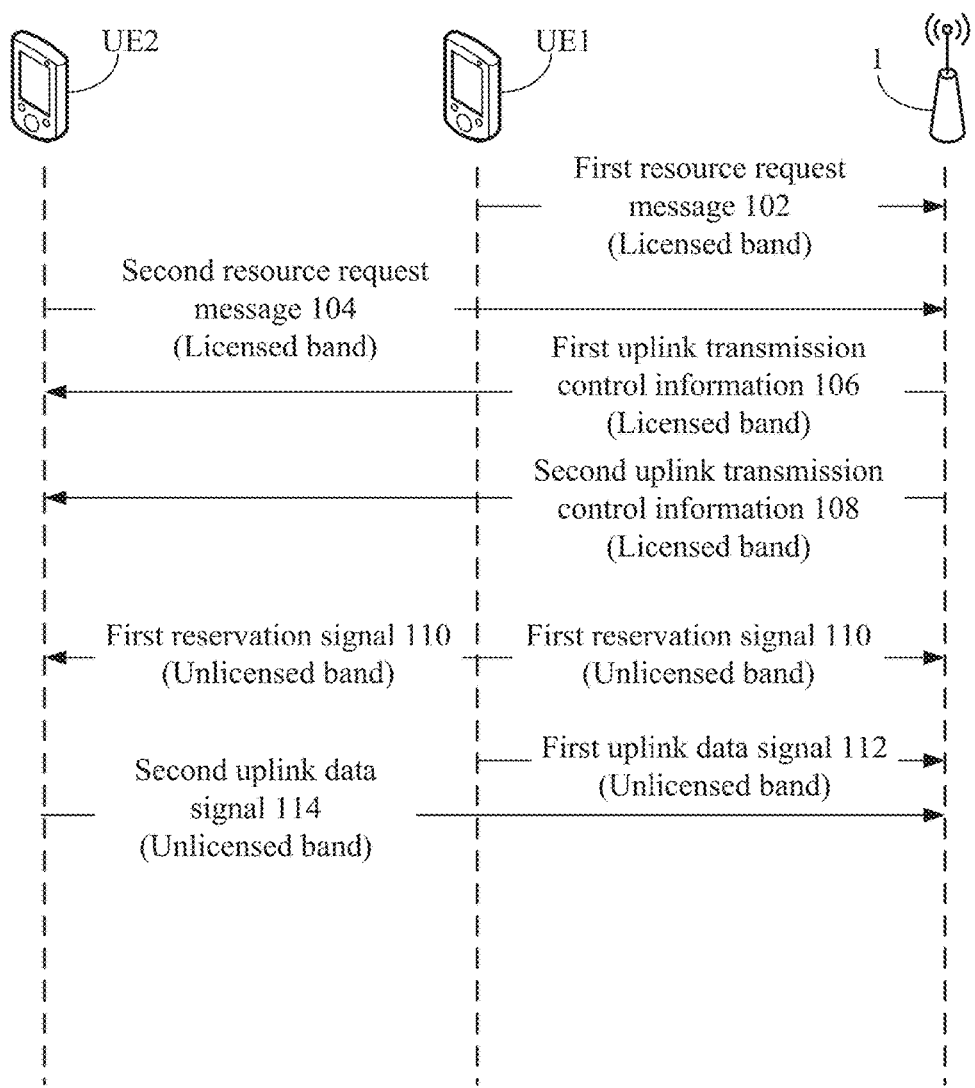
FIG. 2 is a schematic view illustrating the signal transmission among a base station 1, a user equipment UE1 and a user equipment UE2.

A first embodiment of the present invention is as shown in FIG. 1 and FIG. 2. FIG. 1 is a schematic view of a wireless communication system WCS of the present invention. The wireless communication system WCS may be a 4G LTE wireless communication system, or a similar wireless communication system based on the OFDMA technology. To simplify the description, FIG. 1 only depicts a base station 1, a user equipment UE1 and a user equipment UE2 in the wireless communication system WCS. However, as can be readily appreciated by those of ordinary skill in the art, the wireless communication system WCS may comprise several base stations and several UEs in practical use scenarios, and each base station may serve a plurality of UEs.

The base station 1 is configured with a licensed band so as to serve UEs within the signal coverage thereof. In this embodiment, the user equipment UE1 and the user equipment UE2 are located within the signal coverage of the base station 1 and are connected with the base station 1. Meanwhile, the base station 1 puts the user equipment UE1 and the user equipment UE2 into a same user group G1. The base station 1 may put all the UEs connected thereto into the same user group G1. Moreover, the base station 1 may also put several adjacent UEs into the same user group G1 according to the position relationships between the UEs. However, how the base station 1 puts the several UEs into the same user group G1 is not intended to limit the claimed scope of the present invention. How the present invention achieves the multiplexing transmission by grouping several UEs together shall be readily appreciated by those of ordinary skill in the art based on the subsequent description.

FIG. 2 is a schematic view illustrating the signal transmission among the base station 1, the user equipment UE1 and the user equipment UE2. When the user equipment UE1 and the user equipment UE2 want to transmit uplink data, the user equipment UE1 uses the licensed band to transmit a first resource request message 102 to the base station 1, and the user equipment UE2 uses the licensed band to transmit a second resource request message 104 to the base station 1. Thereafter, the base station 1 allocates the radio resources of the unlicensed band respectively according to the first resource request message 102 and the second resource request message 104 for use by the user equipment UE1 and the user equipment UE2.

Figure 3A:
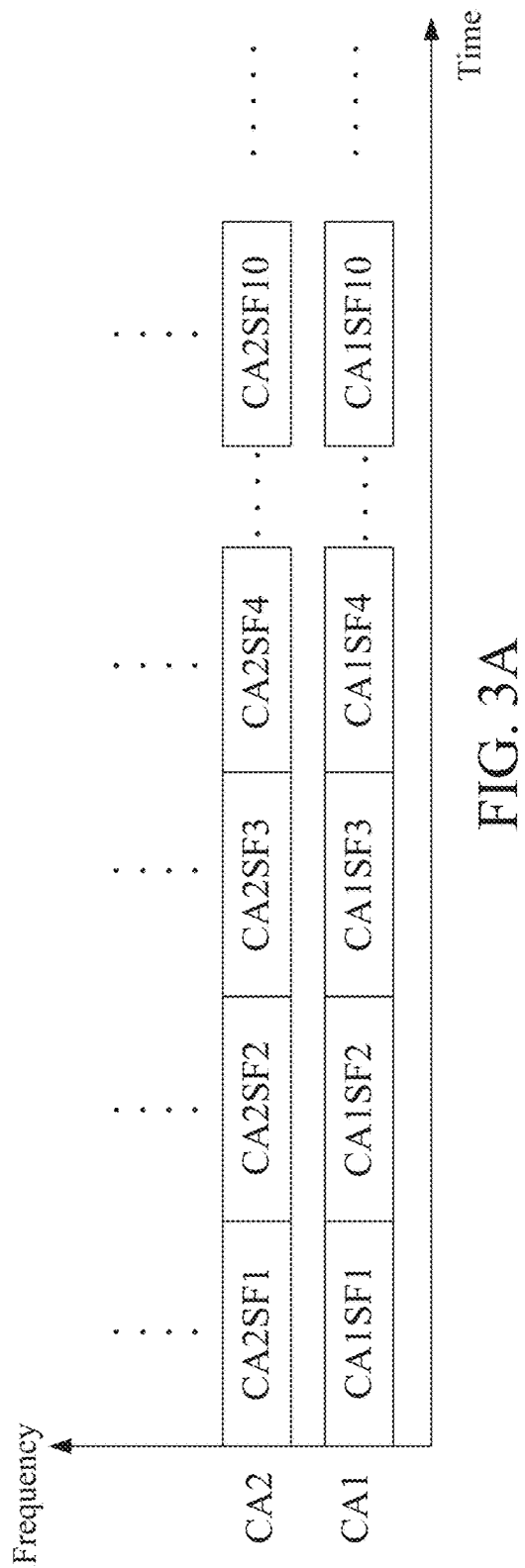
FIG. 3A is a schematic view of an unlicensed band.
Figure 3B:
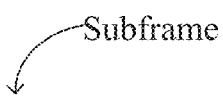
FIG. 3B depicts an exemplary example in which a subframe has a plurality of resource blocks.

Further speaking, the unlicensed band may be the 2.4 GHz band and the 5 GHz band used by the wireless local area network, but is not limited thereto. The unlicensed band may have several carriers (also called channels). As shown in FIG. 3A, the unlicensed band has several carriers (e.g., a carrier CA1 and a carrier CA2), each of the carriers may be further divided into several frames in the time and based on the OFDMA architecture, and each of the frames may be further divided into several subframes. Taking the 4G LTE wireless communication system as an example, one frame in the carrier CA1 may include 10 subframes, i.e., a subframe CA1SF1, a subframe CA1SF2, a subframe CA1SF3, a subframe CA1SF4, . . . , and a subframe CA1SF10. Moreover, as shown in FIG. 3B, taking the 4G LTE wireless communication system as an example, each subframe has 12 resource blocks when the carrier bandwidth is 1.4 MHz.

Figure 4A:
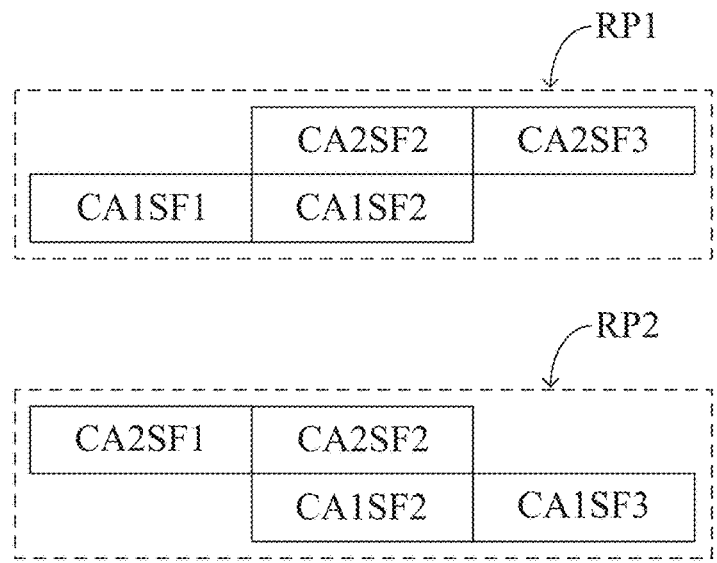
FIG. 4A depicts an exemplary example of a first unlicensed band radio resource pool RP1 and a second unlicensed band radio resource pool RP2.

In this embodiment, as shown in FIG. 4A, it is assumed that the base station 1 allocates part of the resource blocks in the subframes CA1SF1 and CA1SF2 of the carrier CA1 and subframes CA2SF2 and CA2SF3 of the carrier CA2 of the unlicensed band to the user equipment UE1 to constitute a first unlicensed band radio resource pool RP1; and it is assumed that the base station 1 allocates part of the resource blocks in the subframes CA1SF2 and CA1SF3 of the carrier CA1 and subframes CA2SF1 and CA2SF2 of the carrier CA2 of the unlicensed band to the user equipment UE2 to constitute a second unlicensed band radio resource pool RP2. As can be seen therefrom, the first unlicensed band radio resource pool RP1 and the second unlicensed band radio resource pool RP2 have overlapped subframes CA1SF2 and CA2SF2. In this case, the user equipment UE1 and the user equipment UE2 will certainly contend for the subframes CA1SF1 and CA2SF2 at the same time.

Figure 4B:
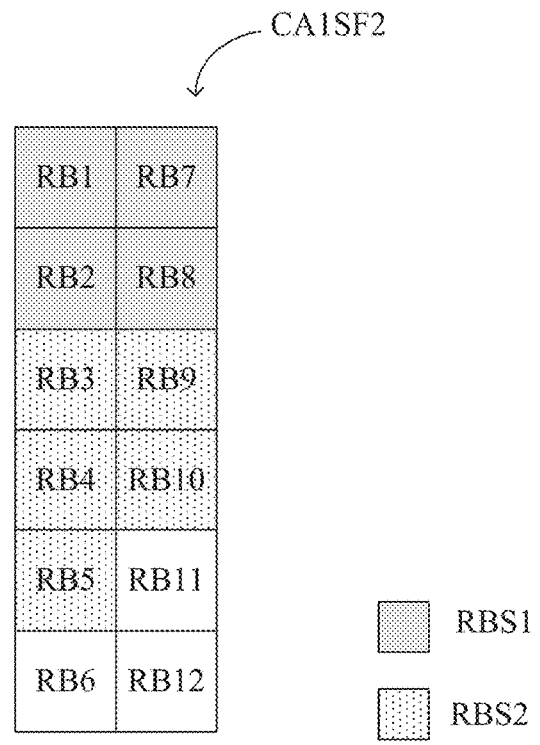
FIG. 4B depicts an exemplary example in which a subframe has a plurality of resource block sets.

In the present invention, the base station 1 further divides the resource blocks of the subframe into a plurality of resource block sets to allocate different block sets to different UEs for use. The size of each block set may be fixed or depend on requirements of the UEs. For example, as shown in FIG. 4B, the base station 1 divides the resource blocks of the subframe CA1SF2 into a first resource block set RBS1 and a second resource block set RBS2. The first resource block set RBS1 is used by the user equipment UE1, and the second resource block set RBS2 is used by the user equipment UE2.

After the radio resources of the unlicensed band are allocated according to the first resource request message 102 and the second resource request message 104, the base station 1 generates first uplink transmission control information 106 and second uplink transmission control information 108. The first uplink transmission control information 106 indicates a first unlicensed band radio resource pool RP1 of an unlicensed band and the second uplink transmission control information indicates a second unlicensed band radio resource pool RP2 of the unlicensed band. Next, the base station 1 transmits the first uplink transmission control information 106 and the second uplink transmission control information 108 to a first user equipment UE1 and a second user equipment UE2 of the user group G1 respectively via the licensed band. In this way, the first user equipment UE1 and the second user equipment UE2 can know the resource blocks of each subframe allocated thereto respectively according to the uplink transmission control information 106 and the second uplink transmission control information 108.

It shall be appreciated that, the first resource request message 102 and the second resource request message 104 may be transmitted via the uplink radio resource defined by the wireless communication system WCS itself, e.g., the physical uplink control channel (PUCCH) in the 4G LTE wireless communication system. Additionally, the first uplink transmission control information 106 and the second uplink transmission control information 108 may be transmitted via the downlink radio resource defined by the wireless communication system WCS itself, e.g., the physical downlink control channel (PDCCH) in the 4G LTE wireless communication system.

Moreover, the first uplink transmission control information 106 and the second uplink transmission control information 108 may respectively indicate the user group G1 where the first user equipment UE1 and the second user equipment UE2 are located. For example, the first uplink transmission control information 106 may carry a group identity (ID) of the user group G1 or user IDs of all the UEs in the user group G1. In another embodiment, the base station 1 may further generate user group information and transmit the user group information through broadcasting to notify the UEs served by the base station 1 of the user groups to which the UEs belong. For example, the user group information may be represented in the form of a data table and the data table may record one or more group IDs and one or more user IDs corresponding to each group ID, or individually record one or more user IDs corresponding to each user group. Additionally, in another embodiment, when the UEs connected to the base station all belong to the same user group, it may be unnecessary for the base station to provide the user group information.

Thereafter, the first user equipment UE1 can contend for a first subframe (i.e., any one of the subframes CA1SF1, CA1SF2, CA2SF2 and CA2SF3, usually contend in time sequence) of the first unlicensed band radio resource pool RP1 according to the first uplink transmission control information 106. Similarly, the second user equipment UE2 can contend for a second subframe (i.e., any one of the subframes CA1SF2, CA1SF3, CA2SF1 and CA2SF2, usually contend in time sequence) of the second unlicensed band radio resource pool RP2 according to the second uplink transmission control information 108.

The first user equipment UE1 transmits a first reservation signal 110 after having successfully contended for the first subframe so as to inform other UEs that it will transmit a first uplink data signal 112 in the first subframe. Specifically, the first user equipment UE1 first performs the CCA before the arrival of the first subframe, and transmits the first reservation signal 110 after the CCA succeeds, and then transmits the first uplink data signal 112 in the first subframe. For example, if the first user equipment UE1 wants to contend for the subframe CA1SF2, then the first user equipment UE1 will first perform the CCA at the end of the subframe CA1SF1. If the CCA succeeds, then a first reservation signal 110 is transmitted, which means that the contention for the subframe CA1SF2 has succeeded. After the contention succeeds, the user equipment UE1 can transmit the first uplink data signal 112 in the subframe CA1SF2, i.e., transmit the first uplink data signal 112 via the first resource block set RBS1.

Furthermore, when the first subframe for which the first user equipment UE1 contends and the second subframe for which the second user equipment UE2 contends are the same subframe (e.g., the subframe CA1SF2), the second user equipment UE2 will find the existence of the first reservation signal 110 during the CCA and then further determine whether the first reservation signal 110 is associated with an ID of the user group G1. For example, the ID may be one of a group ID, a cell ID, a UE ID and any combination thereof. If the second user equipment UE2 determines that the first reservation signal 110 is associated with the ID of the user group G1, then the second user equipment UE2 transmits a second uplink data signal 114 in the same subframe (i.e., the subframe CA1SF2). In this way, the base station 1 can receive the first uplink data signal 112 and the second uplink data signal 114 in the subframe CA1SF2.

In the present invention, the reservation signal generated by each UE may be a specific sequence, and different sequences are well orthogonal to each other (e.g., the Zadoff-Chu sequences). There is a one-to-one correspondence between those sequences and different group IDs, cell IDs or the combination thereof. In this way, when the sequence is decided according to the group ID, the cell ID or the combination thereof, the reservation signals transmitted by UEs in different user groups will not interfere with each other. When the IDs are the UE IDs, there is no mutual interference even if the UEs in the user group all transmit the reservation signals.

Figures 5A, 5B:
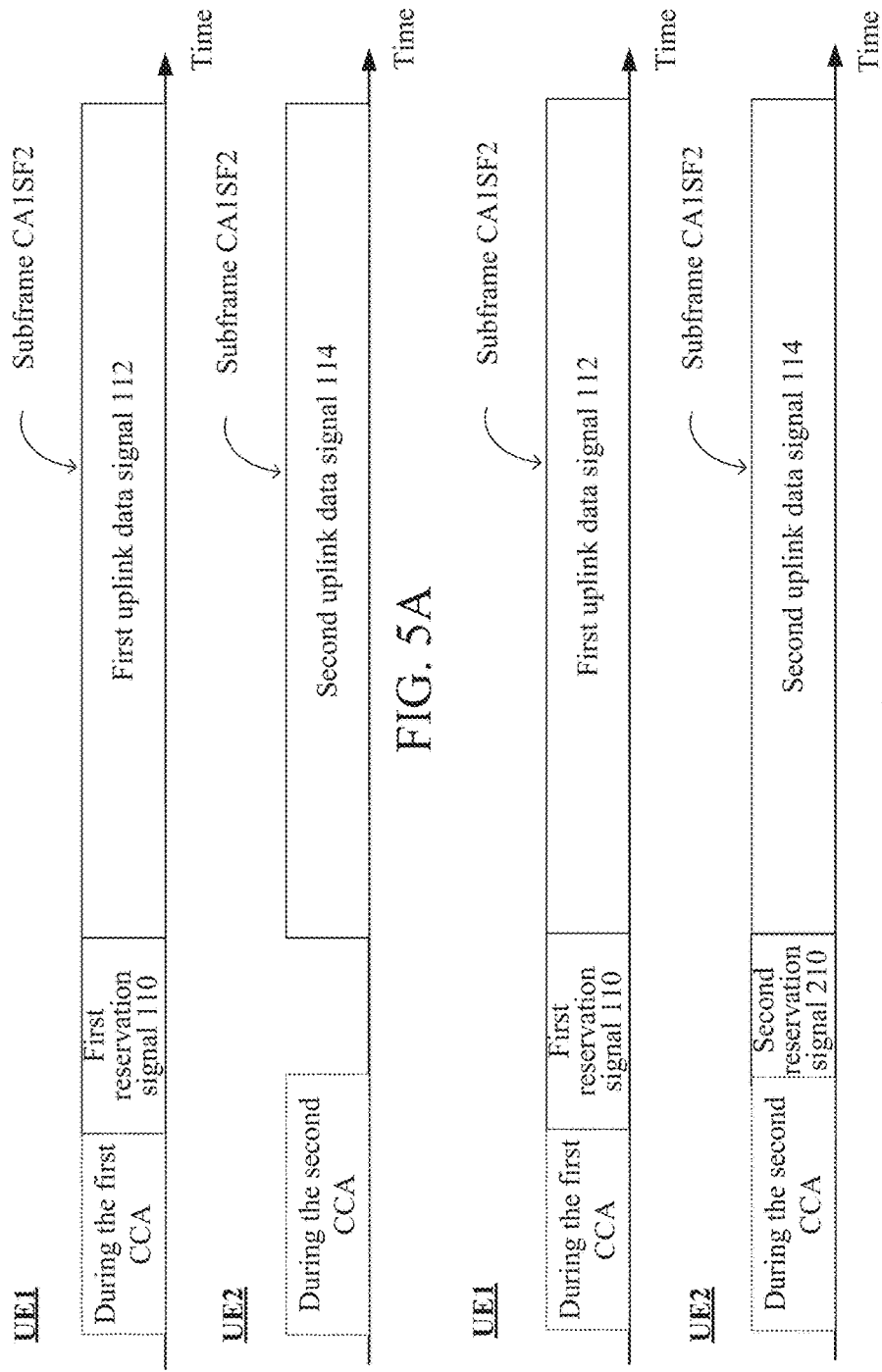
FIG. 5A depicts an exemplary example in which the user equipment UE1 and the user equipment UE2 contend for a subframe.
FIG. 5B depicts another exemplary example in which the user equipment UE1 and the user equipment UE2 contend for a subframe.

Now, this will be further illustrated. As shown in FIG. 5A, after confirming that the carrier CA1 is clean and available during a first CCA, the user equipment UE1 transmits a first reservation signal 110 and waits for the arrival of the subframe CA1SF2. Upon the arrival of the subframe CA1SF2, the user equipment UE1 transmits the first uplink data signal 112 in the subframe CA1SF2. On the other hand, the user equipment UE2 finds during a second CCA that the carrier CA1 is not clean and available but has a signal (i.e., the first reservation signal 110) thereon. In this case, different from the prior art, the user equipment UE2 of the present invention further receives the first reservation signal 110 and identifies whether the first reservation signal 110 is an identifiable sequence.

In other words, the user equipment UE2 attempts to identify a sequence based on the first reservation signal 110, and determines whether the sequence is associated with the group ID of the user group G1 to which the user equipment UE2 belongs, the cell ID or the combination thereof. If it is determined that the first reservation signal 110 is associated with the group ID of the user group G1 or the cell ID, then the user equipment UE2 waits for the arrival of the subframe CA1SF2, and transmits the second uplink data signal 114 in the subframe CA1SF2 upon the arrival of the subframe CA1SF2.

Additionally, in an implementation where the ID is the UE ID or is the combination of the UE ID and both or either of the group ID and the cell ID, there is a one-to-one correspondence between the sequences represented by the reservation signals and the different UE IDs, or between the sequences represented by the reservation signals and the combinations of the UE IDs and both or either of the group IDs and the cell IDs. For example, as shown in FIG. 5B, after identifying a sequence from the first reservation signal 110, the user equipment UE2 determines whether the sequence is associated with the UE ID of one of the UEs in the user group G1 to which the user equipment UE2 belongs, i.e., determines whether the sequence corresponds to an UE ID in the user group G1 or corresponds to the combination of the UE ID and both or either of the group ID and the cell ID.

If it is determined that the first reservation signal 110 is associated with the UE ID of one of the UEs in the user group G1, then the user equipment UE2 may also generate and transmit a second reservation signal 210 based on the sequence corresponding to the UE ID of the user equipment UE2 itself or corresponding to the combination of the UE ID and both or either of the group ID and the cell ID. Thereafter, the user equipment UE2 waits for the arrival of the subframe CA1SF2, and transmits the second uplink data signal 114 in the subframe CA1SF2 upon the arrival of the subframe CA1SF2. As described earlier, the first reservation signal 110 and the second reservation signal 210 are generated based on sequences that are well orthogonal to each other, so mutual interference therebetween can be avoided. Moreover, by having each of the UEs transmit the reservation signal corresponding to the sequence of the user ID thereof, the base station 1 can confirm in advance which UEs will transmit the uplink data signal.

Additionally, the reservation signal of the present invention not only can be generated based on the associated sequence corresponding to the ID, but may also be the same as the reservation signal in the prior art. In this case, in addition to transmitting the reservation signal, the UE succeeding in the contention needs to further transmit a message or an indication on the uplink channel in the licensed band to notify the surrounding UEs and the base station 1 that it has transmitted the reservation signal. The uplink channel may be a reservation channel that is newly defined and used for transmitting the broadcast information or an uplink channel defined by the wireless communication system WCS itself (e.g., the PUCCH in the 4G LTE wireless communication system). The transmitted message or indication may be a simple indication signal or one of the group ID, the cell ID, the UE ID and any combination thereof.

Figure 6A:
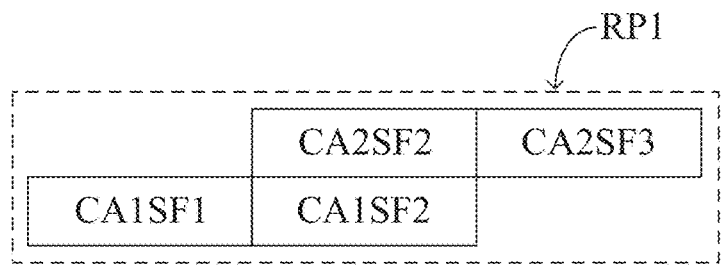
FIG. 6A depicts another exemplary example of a first unlicensed band radio resource pool RP1 and a second unlicensed band radio resource pool RP2.
Figure 6B:
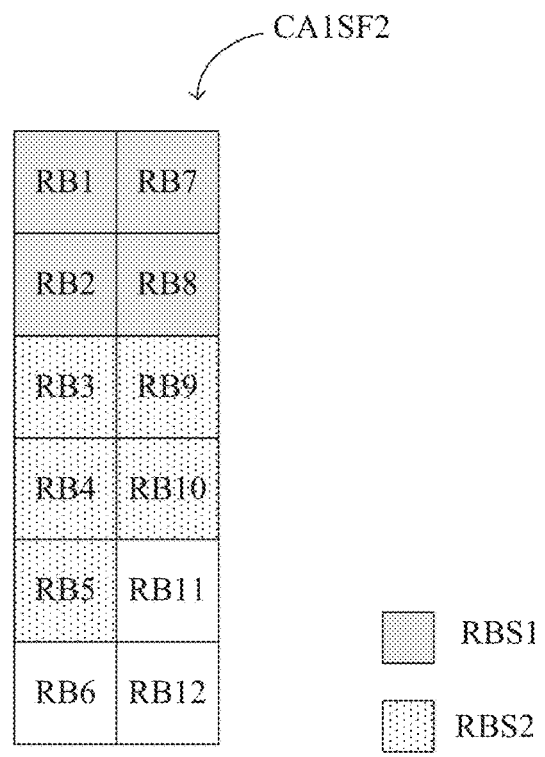
FIG. 6B depicts another exemplary example in which a subframe has a plurality of resource block sets.

Please refer to FIG. 6A and FIG. 6B for a second embodiment of the present invention. This embodiment differs from the first embodiment in that, the base station 1 allocates the radio resources of the unlicensed band in units of user groups. In this case, each UE in the user group contends for the same set of subframes. For example, as shown in FIG. 6, the base station 1 allocates part of the resource blocks in the subframes CA1SF1, CA1SF2 of the carrier CA1 and the subframes CA2SF2, CA2SF3 of the carrier CA2 of the unlicensed band to the user equipment UE1 to constitute the first unlicensed band radio resource pool RP1. Meanwhile, the base station 1 also allocates part of the resource blocks in the subframes CA1SF1, CA1SF2 of the carrier CA1 and the subframes CA2SF2, CA2SF3 of the carrier CA2 of the unlicensed band to the user equipment UE2 to constitute the second unlicensed band radio resource pool RP2. As can be seen therefrom, the subframes in the first unlicensed band radio resource pool RP1 and those in the second unlicensed band radio resource pool RF2 are completely overlapped. In this case, the user equipment UE1 and the user equipment UE2 will certainly contend for all the subframes at the same time.

Figure 7:
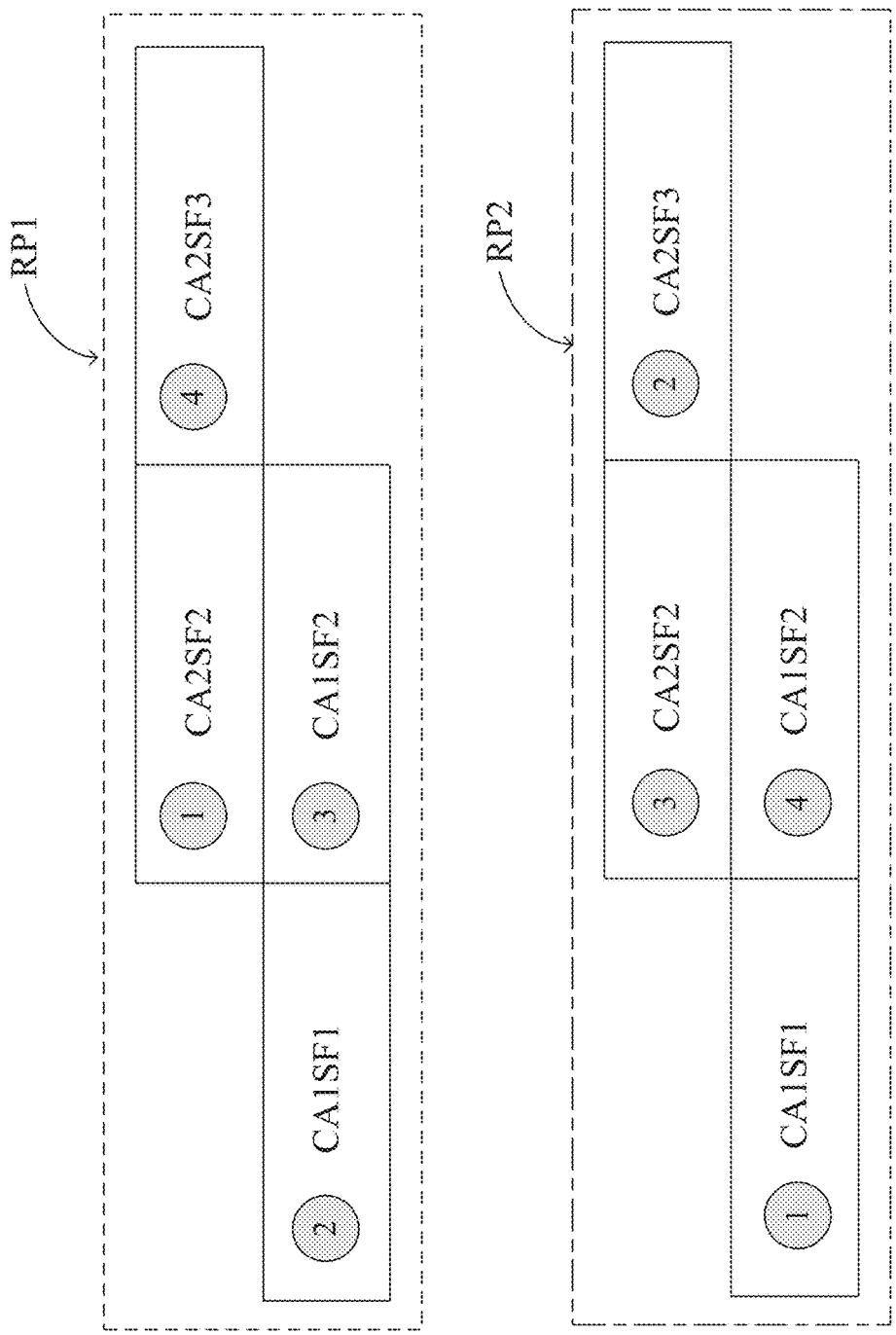
FIG. 7 depicts an exemplary example in which a contention priority exists among subframes.

Please refer to FIG. 7 for a third embodiment of the present invention, which is an extension of the second embodiment. In this embodiment, the base station 1 may further indicate in the uplink transmission control information transmitted to each UE a contention priority in which each UE contends for the subframes allocated thereto so that the contention for the radio resources of the unlicensed band can be fairer, thereby avoiding the case where other user groups or systems cannot successfully contend for the radio resource of the unlicensed band.

For example, the first uplink transmission control information 106 may indicate that the subframes of the first user equipment UE1 in a descending contention priority are the subframe CA2SF2, the subframe CA1SF1, the subframe CA1SF2, and the subframe CA2SF3, and the second uplink transmission control information 108 may indicate that the subframes of the second user equipment UE2 in a descending contention priority are the subframe CA1SF1, the subframe CA2SF1, the subframe CA2SF2, and the subframe CA1SF2. In this case, the user equipment UE1 needs to first contend for the subframe CA2SF2, and it contends for a subframe of a lower contention priority level only if the contention for the subframe CA2SF2 fails or if there is still other uplink data to be transmitted.

It shall be noted that, the contention priority level of the subframe CA1SF1 is lower than that of the subframe CA2SF2; however, when the user equipment UE1 fails in the contention for the subframe CA2SF2, the subframe CA1SF1 becomes obsolete in time and thus the user equipment UE1 cannot perform the CCA to contend for the subframe CA1SF1. Moreover, when the user equipment UE1 fails in the contention for the subframe CA2SF2, it is also too late for the user equipment UE1 to perform the CCA to contend for the subframe CA1SF2. In this case, the user equipment UE1 has no alternative but to contend for the subframe CA2SF3.

Similarly, the user equipment UE2 will first contend for the subframe CA1SF1. When the user equipment UE2 fails in the contention for the subframe CA1SF1, the user equipment UE2 will contend for the subframe CA2SF3. However, when user equipment UE2 fails in the contention for the subframe CA2SF3, the subframe CA2SF2 and the subframe CA1SF2 becomes obsolete in time and thus the user equipment UE2 cannot perform the CCA to contend for the subframe CA2SF2 and the subframe CA1SF2.

Although the UE needs to contend for the subframes in sequence based on the contention priority of the subframes, the UE may also detect whether other UEs in the user group have successfully contended for a subframe, and transmit the uplink data signal to the base station 1 in the subframe for which other UEs have successfully contended. For example, although the user equipment UE1 has not successfully contended for the subframe CA1SF1 with priority over other UEs, the user equipment UE1 still detects whether there is a reservation signal transmitted by a UE in the same user group before the arrival of the subframe CA1SF1. Therefore, when the user equipment UE2 transmits the second reservation signal 210 after having successfully contended for the subframe CA1SF1, the user equipment 1 can transmit the first uplink data signal 112 in the subframe CA1SF1 in response to the detection of the second reservation signal 210.

As can be seen from the above description, there is a contention priority among the UEs in the contention for the subframes allocated to the UEs; however, as long as a UE in a user group has successfully contended for a subframe, other UEs in the same user group can transmit the uplink data signal via the subframe, thereby achieving the multiplexing effect. It shall be appreciated that, the contention priority among the UEs is generated randomly, although it is not limited thereto.

Figure 8:
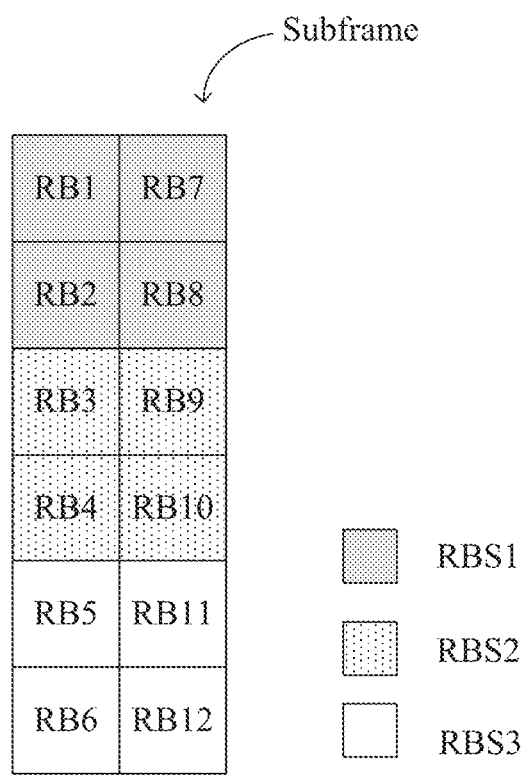
FIG. 8 depicts another exemplary example in which a subframe has a plurality of resource block sets.

Please refer to FIG. 8 for a fourth embodiment of the present invention, which is an extension of the first embodiment and the second embodiment. In this embodiment, although the base station 1 further divides the resource blocks of the subframe into a plurality of resource block sets (e.g., resource block sets RBS1, RBS2 and RBS3 of FIG. 8), it is unnecessary to specifically allocate the resource block sets in the subframe to specific UEs. In other words, the uplink transmission control information transmitted to each UE only needs to indicate the subframes in the unlicensed band radio resource pool rather than the allocated resource block sets in each subframe. It shall be noted that, although the resource blocks of the subframe is evenly divided into three equal parts by the resource block sets RBS1, RBS2 and RBS3 depicted in FIG. 8, the base station 1 may also decide, depending on the practical operation status, how many parts the resource blocks are evenly divided into (which for example may be decided according to the number of the UEs) or the division proportions (which for example may be decided according to the uplink resource demand of each UE).

To achieve the aforesaid effect, there is a user priority among the UEs to decide the right to the use of the resource block sets. The user priority may be decided based on the value of the user IDs or based on the sequence in which the reservation signals are transmitted. For example, taking the case where the user priority is decided based on the user IDs as an example, if the user ID of the first user equipment UE1 is smaller than that of the second user equipment UE2, then the first user equipment UE1 has the higher priority to use the resource block set RBS1 with the smallest number, and the second user equipment UE2 uses the resource block set RBS2 with the second smallest number. Similarly, if the user priority is decided based on the sequence in which the reservation signals are transmitted, then the user, who has successfully contended for the subframe and transmitted the reservation signal first, certainly has the higher priority over other users to use the resource block set RBS1 with the smallest number.

In this way, according to the user priority, the first user equipment UE1 selects the first resource block set (i.e., the resource block set RBS1) of the resource block sets of the same subframe (any one of the subframes CA1SF1 and CA2SF2 in the first embodiment, or any one of the subframes CA1SF1 and CA2SF2 in the second embodiment), and the second user equipment UE2 selects the second resource block set (i.e., the resource block set RBS2) of the resource block sets of the same subframe. Next, the first user equipment UE1 uses the resource block set RBS1 to transmit the first uplink data signal 112, and the second user equipment UE2 uses the resource block set RBS2 to transmit the second uplink data signal 114.

It shall be appreciated that, in this embodiment, both the first user equipment UE1 and the second user equipment UE2 need to learn the UE ID of each other by transmitting the reservation signal (as shown in FIG. 5B) or transmitting a specific signal through a reservation channel. Additionally, although only two UEs are described in the aforesaid embodiments as an example, the implementation with more than three UEs shall be readily appreciated by those of ordinary skill in the art based on the aforesaid description, and thus will not be further described herein. Furthermore, there is inter-blocking among UEs of different user groups as can be appreciated by those of ordinary skill in the art, and this will not be further described herein.

Figure 9A:
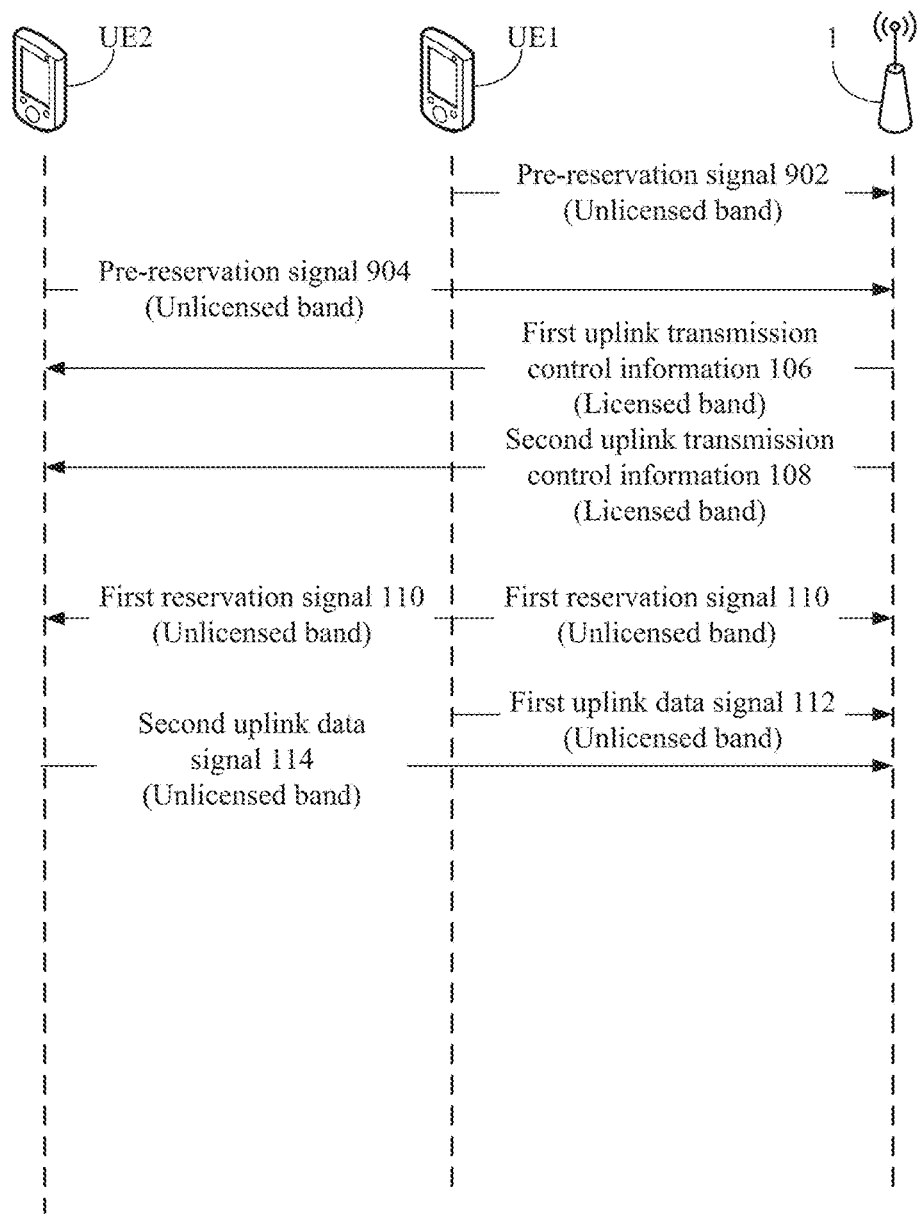
FIG. 9A is another schematic view illustrating the signal transmission among the base station 1, the user equipment UE1 and the user equipment UE2.
Figure 9B:
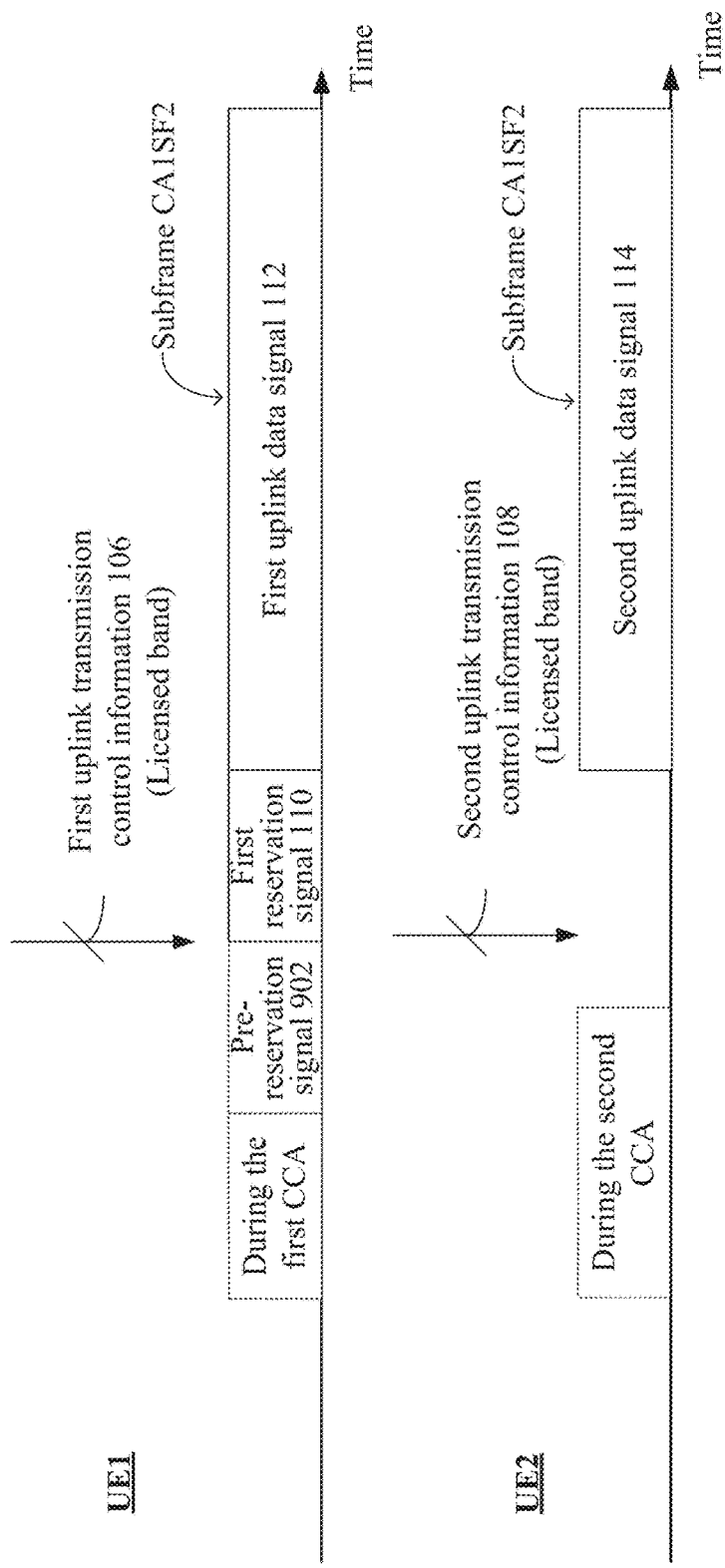
FIG. 9B depicts another exemplary example in which the user equipment UE1 and the user equipment UE2 contend for a subframe.

A fifth embodiment of the present invention is as shown in FIG. 9A and FIG. 9B. Different from the first embodiment, the UE first detects whether at least one carrier of the unlicensed band is clean and available (e.g., by performing the CCA) in this embodiment. If the carrier is clean and available, then a pre-reservation signal is transmitted on the clean and available carrier. In other words, in the present invention, the UE may transmit the pre-reservation signal instead of the resource request message and the pre-reservation signal carries the resource request information.

Similarly, the pre-reservation signal may be a specific sequence, and different sequences are well orthogonal to each other (e.g., the Zadoff-Chu sequences). Here, each sequence may correspond to an uplink resource size. Moreover, each sequence may also correspond to the combination of an uplink resource size and a UE ID. Accordingly, after receiving the pre-reservation signal, the base station 1 can identify the UE and learn the uplink resource size required by the UE.

Additionally, transmitting the pre-reservation signal on the clean and available carrier is equivalent to that the UE has successfully contended for the right to the use of the carrier in advance. Then, the base station 1 only needs to allocate the subframe of at least one carrier having the pre-reservation signal to the UEs in the user group G1 for use according to the at least one carrier. In other words, in this embodiment, if the UE has transmitted the pre-reservation signal, then it means that the upcoming subframe in this carrier can be used by the UE to transmit the uplink data signal.

As shown in FIG. 9A, the user equipment UE1 performs the CCA on at least one carrier, and if the CCA succeeds, then the user equipment UE1 transmits a pre-reservation signal 902 on the carrier on which the CCA is successfully performed. Similarly, the user equipment UE2 performs the CCA on at least one carrier, and if the CCA succeeds, then the user equipment UE2 transmits a pre-reservation signal 904 on the carrier on which the CCA is successfully performed. The sequence of the pre-reservation signal 902 corresponds to the user ID of the user equipment UE1 and the uplink resource size required by the user equipment UE1. The sequence of the pre-reservation signal 904 corresponds to the user ID of the user equipment UE2 and the uplink resource size required by the user equipment UE2. It shall be appreciated that, the number of pre-reservation signals transmitted by the UE is not limited in the present invention. For example, the UE may transmit several pre-reservation signals on several available carriers at the same time.

Thereafter, if the pre-reservation signal 902 is detected on a carrier by the base station 1, then the base station 1 can identify the user equipment UE1, learn the uplink resource size required by the user equipment UE1, and allocate the next subframe on this carrier to the user equipment UE1 so as to transmit the first uplink transmission control information 106 to the user equipment UE1. Similarly, if the pre-reservation signal 904 is detected on a carrier by the base station 1, then the base station 1 can identify the user equipment UE2, learn the uplink resource size required by the user equipment UE2, and allocate the next subframe on this carrier to the user equipment UE2 so as to transmit the second uplink transmission control information 108 to the user equipment UE2.

After receiving the first uplink transmission control information 106, the user equipment UE1 generates the first reservation signal 110 to determine that the contention for the subframe succeeds. For example, as shown in FIG. 9B, the user equipment UE1 confirms that the carrier CA1 is clean and available during the first CCA, so it transmits the pre-reservation signal 902. After the pre-reservation signal 902 is detected on the carrier CA1 by the base station 1, the base station 1 decides to allocate the next subframe CA1SF2 to the user equipment UE1 for use so as to generate and transmit the first uplink transmission control information 106 to the user equipment UE1. Thereafter, the user equipment UE1 generates and transmits the first reservation signal 110 to confirm that the contention for the subframe CA1SF2 succeeds. Next, the user equipment UE1 waits for the arrival of the subframe CA1SF2 to transmit the first uplink data signal 112.

Here, it is assumed that the user equipment UE2 transmits a reservation signal 904 in other carriers and has not successfully contended for the carrier CA1 in advance. In this case, after the pre-reservation signal 904 is detected on other carriers by the base station 1, the base station 1 may also allocate the subframe CA1SF2 to the user equipment UE2 which belongs to the same user group G1 so as to generate and transmit the second uplink transmission control information 108 to the user equipment UE2 in order to make full use of the resources of the carrier CA1. In this way, after the first reservation signal 110 is detected on the CA1 by the user equipment UE2, the user equipment UE2 waits for the arrival of the subframe CA1SF2 and transmits the second uplink data signal 114 on the subframe CA1SF2.

It shall be appreciated that, it is assumed that the base station 1 allocates the same subframe to the user equipment UE1 and the user equipment UE2 in the same user group G1 in the aforesaid example. However, the base station 1 may also directly allocate the next coming subframe on the carrier for which the user equipment UE2 has successfully contended in advance to the user equipment UE2 for use. In this case, the user equipment UE2 can transmit the second reservation signal 210 on the carrier to confirm that it has successfully contended for the subframe, and waits for the arrival of the subframe to transmit the second uplink data signal in this subframe. Moreover, the base station 1 may also allocate the subframe to other UEs so that the UEs can share the subframe, thereby achieving the multiplexing effect.

Furthermore, although the UE can transmit several pre-reservation signals on several available carriers at the same time, part of the carriers may be found having other interference signals at the same time when the base station is monitoring these carriers. In this case, the base station can determine the channel quality of each of the carriers according to the degree of interference of these carriers, and then allocate the subframes on one or more carriers having relatively good channel quality among these carriers to the UEs according to the channel quality of each of the carriers. In other words, by using the subframe of the carrier having relatively good channel quality, the UE can be prevented from transmitting the uplink data signal on the carrier having more interference signals, which would otherwise make the base station unable to decode the uplink data signal successfully. Various variants of the implementations can be readily appreciated by those of ordinary skill in the art based on the aforesaid description, and thus will not be further described herein.

Figure 10:
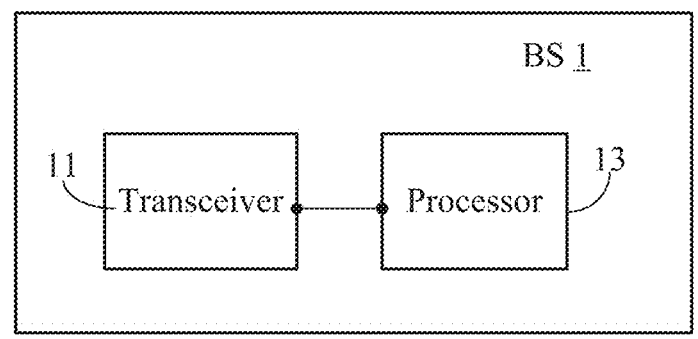
FIG. 10 is a schematic view of the base station 1 of the present invention.

A sixth embodiment of the present invention is as shown in FIG. 10, which is a schematic view of the base station 1. The base station 1 comprises a transceiver 11 and a processor 13. It shall be noted that, other elements (e.g., elements unrelated to the present invention, such as a storage, a power supply module or the like) of the base station 1 are omitted from depiction in the attached drawings for simplification of the description. The transceiver 11 is electrically connected with the processor 13. The processor 13 is configured to generate information, signals, and messages and make determinations or the like. The transceiver 11 is configured to transmit and receive information, signals, messages or the like.

For the first embodiment, the processor 13 is configured to receive the first resource request message 102 and the second resource request message 104 via the transceiver 11. Thereafter, the processor 13 generates the first uplink transmission control information 106 and the second uplink transmission control information 108 based on the first resource request message 102 and the second resource request message 104. As described earlier, the first uplink transmission control information indicates the first unlicensed band radio resource pool RP1 of an unlicensed band and the second uplink transmission control information indicates the second unlicensed band radio resource pool RP2 of the unlicensed band.

Next, the processor 13 transmits the first uplink transmission control information 106 and the second uplink transmission control information 108 to the first user equipment UE1 and the second user equipment UE2 of the user group G1 respectively via the transceiver 11. In this way, the first user equipment UE1 can contend for a first subframe of the first unlicensed band radio resource pool RP1 according to the first uplink transmission control information 106, and the second user equipment UE2 can contend for a second subframe of the second unlicensed band radio resource pool RP2 according to the second uplink transmission control information 108.

When the first UE1 transmits the first reservation signal 110 after having successfully contended for the first subframe (e.g., the subframe CA1SF2) and the first subframe is the same subframe as the second subframe (e.g., both of the first subframe and the second subframe are the subframe CA1SF2), the first user equipment UE1 transmits the first uplink data signal 112 in the same subframe, and the second user equipment UE2 determines that the first reservation signal 110 is associated with the ID of the user group G1 so as to transmit the second uplink data signal 114 in the same subframe. Thereafter, the processor 13 further receives the first uplink data signal 112 and the second uplink data signal 114 via the transceiver 11.

As described earlier, the first unlicensed band radio resource pool and the second unlicensed band radio resource pool comprise a plurality of subframes, the subframes are distributed on at least one carrier and include the first subframe and the second subframe, i.e., as shown in FIG. 3A, FIG. 3B and FIG. 4A. Moreover, each of the subframes comprises a plurality of resource block sets, as shown in FIG. 4B and FIG. 8. The first user equipment UE1 is configured to use the first resource block set RBS1 among the resource block sets of the same subframe (e.g., the subframe CA1SF2) to transmit the first uplink data signal 112. The second user equipment UE2 is configured to use a second resource block set RBS2 among the resource block sets of the same subframe (e.g., the subframe CA1SF2) to transmit the second uplink data signal 114. Because the first resource block set RBS1 is different from the second resource block set RBS2, the first user equipment UE1 and the second user equipment UE2 can commonly use the same subframe to respectively transmit the uplink data signal thereof.

Moreover, for the third embodiment, the first user equipment UE1 further contends for a first subframe (e.g., the subframe CA2SF2) of the first unlicensed band radio resource pool RP1 according to a contention priority, and the second user equipment UE2 further contends for a second subframe (e.g., the subframe CA1SF1) of the second unlicensed band radio resource pool RP2 according to another contention priority.

Additionally, for the fourth embodiment, there is a user priority among the UEs. In this case, the first user equipment UE1 and the second user equipment UE2 respectively decide the first resource block set RB1 and the second resource block set RB2 among the resource block sets of the same subframe (e.g., the subframe CA1SF2) according to the user priority, and use the first resource block set RB1 and the second resource block set RB2 to transmit the first uplink data signal 112 and the second uplink data signal 114 respectively. Similarly, because the first resource block set RBS1 is different from the second resource block set RBS2, the first user equipment UE1 and the second user equipment UE2 can commonly use the same subframe to respectively transmit the uplink data signal thereof.

On the other hand, for the fifth embodiment, the processor 13 further receives a pre-reservation signal 902 from the first user equipment UE1 via the transceiver 11, and generates the first uplink transmission control information 106 according to the pre-reservation signal 902. As described earlier, the pre-reservation signal 902 is transmitted on at least one carrier of the unlicensed band after the first user equipment UE1 has detected that the at least one carrier is available.

Figure 11:
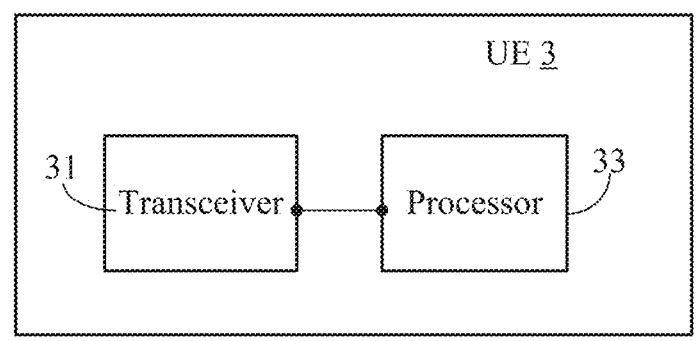
FIG. 11 is a schematic view of a UE 3 of the present invention.

A seventh embodiment of the present invention is as shown in FIG. 11, which is a schematic view of a UE 3. The UE 3 comprises a transceiver 31 and a processor 33. It shall be noted that, other elements (e.g., elements unrelated to the present invention, such as a display module, a storage, a power supply module or the like) of the UE 3 are omitted from depiction in the attached drawings for simplification of the description. The transceiver 31 is electrically connected with the processor 33. The processor 33 is configured to generate information, signals, and messages and make determinations or the like. The transceiver 31 is configured to transmit and receive information, signals, messages or the like. The UE 3 may be the user equipment UE1 or the user equipment UE2 of the aforesaid embodiments.

For the first embodiment and the second embodiment, if the UE 3 is the user equipment UE1, then the processor 33 transmits the resource request message (i.e., the first resource request message 102) to the base station 1 via the transceiver 31 and receives the uplink transmission control information (i.e., the first uplink transmission control information 106) from the base station 1. The uplink transmission control information 106 indicates the unlicensed band radio resource pool (i.e., the first unlicensed band radio resource pool RP1) of the unlicensed band. Thereafter, the processor 33 contends for a specific subframe (e.g., the subframe CA1SF2) of the unlicensed band radio resource pool RP1 via the transceiver 31 according to the uplink transmission control information 106. If the contention for the specific subframe via the transceiver 31 succeeds, then transmitting a reservation signal (i.e., the first reservation signal 110) and transmitting an uplink data signal (i.e., the first uplink data signal 112) on the specific subframe. As described earlier, the reservation signal 110 is associated with the ID of the user group G1 to which the user equipment UE1 belongs.

On the other hand, if the UE 3 is the user equipment UE2, then the processor 33 transmits the resource request message (i.e., the second resource request message 104) to the base station 1 via the transceiver 31 and receives the uplink transmission control information (i.e., the second uplink transmission control information 108) from the base station 1. The uplink transmission control information 108 indicates the unlicensed band radio resource pool (i.e., the second unlicensed band radio resource pool RP2) of the unlicensed band. Thereafter, the processor 33 contends for a specific subframe (e.g., the subframe CA1SF2) of the unlicensed band radio resource pool RP2 via the transceiver 31 according to the uplink transmission control information 108. If the contention for the specific subframe CA1SF2 fails and another reservation signal (i.e., the first reservation signal 110) is detected via the transceiver 31, then it is determined whether the another reservation signal 110 is associated with the ID of the user group G1 to which the user equipment UE2 belongs. If it is determined that the another reservation signal 110 is associated with the ID, then the uplink data signal (i.e., the second uplink data signal 114) is transmitted on the specific subframe CA1SF2.

As described earlier, referring to FIG. 3A, FIG. 3B, FIG. 4A, FIG. 4B, FIG. 5A, FIG. 5B, FIG. 6A and FIG. 6B together, the unlicensed band radio resource pool comprises a plurality of subframes, the subframes are distributed on at least one carrier and include the specific subframe, and each of the subframes comprises a plurality of resource block sets. When the UE 3 is the user equipment UE1, the UE 3 may be configured to use the resource block set RB1 among the resource block sets of the specific subframe to transmit the uplink data signal 112.

Additionally, when the UE 3 is the user equipment UE2, the UE 3 may be configured to use the resource block set RB2 among the resource block sets of the specific subframe to transmit the uplink data signal 114. Another user equipment UE1 that transmits the another reservation signal 110 is configured to use another resource block set RB1 among the resource block sets of the specific subframe to transmit another uplink data signal 112. The resource block set RB1 is different from the another resource block set RB2. Because the first resource block set RBS1 is different from the second resource block set RBS2, the first user equipment UE1 and the second user equipment UE2 can commonly use the same subframe to respectively transmit the uplink data signal thereof.

For the third embodiment, the processor 33 further contends for the specific subframe of the unlicensed band radio resource pool via the transceiver 31 according to the contention priority. For example, as shown in FIG. 7, when the UE 3 is the user equipment UE1, the processor 33 further contends for the specific subframe CA2SF2 of the unlicensed band radio resource pool RP1 via the transceiver 31 according to the contention priority; and when the UE 3 is the user equipment UE2, the processor 33 further contends for the specific subframe CA1SF1 of the unlicensed band radio resource pool RP1 via the transceiver 31 according to the contention priority.

For the fourth embodiment, when the UE is the user equipment UE2 and the another UE that transmits the another reservation signal 110 is the user equipment UE1, the user equipment UE2 selects the resource block set RBS2 among the resource block sets of the specific subframe so as to use the resource block set to transmit the uplink data signal 114 according to the user priority, and the user equipment UE1 selects the another resource block set RBS1 among the resource block sets of the specific subframe so as to use the another resource block set RBS1 to transmit the another uplink data signal 114 according to the user priority.

For the fifth embodiment, the processor 33 further detects via the transceiver 31 that at least one carrier of the unlicensed band is available, and transmits a pre-reservation signal on the at least one carrier so that the base station 1 generates the uplink transmission control information according to the pre-reservation signal. When the UE is the user equipment UE1, the pre-reservation signal is the pre-reservation signal 902 and the uplink transmission control information is 106; and when the UE is the user equipment UE2, the pre-reservation signal is the pre-reservation signal 904, and the uplink transmission control information is 108, as shown in FIG. 9A.

Figure 12:
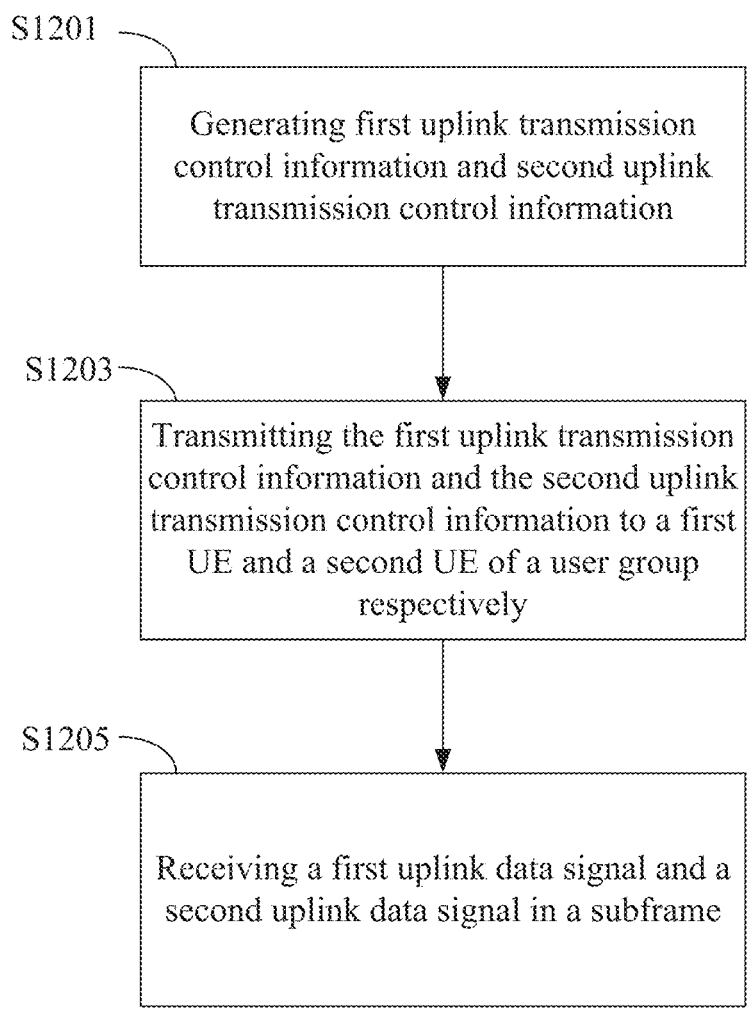
FIG. 12 is a flowchart diagram of a transmission control method of the present invention.

An eighth embodiment of the present invention is as shown in FIG. 12, which is a flowchart diagram of a transmission control method of the present invention. The transmission control method is for use in a base station, e.g., the base station 1 of the aforesaid embodiments. The base station is used in a wireless communication system, e.g., the wireless communication system WCS of the aforesaid embodiments. The base station comprises a transceiver and a processor. The processor is electrically connected to the transceiver and is configured to execute the transmission control method.

First, in step S1201, first uplink transmission control information and second uplink transmission control information are generated. The first uplink transmission control information indicates a first unlicensed band radio resource pool of an unlicensed band. The second uplink transmission control information indicates a second unlicensed band radio resource pool of the unlicensed band. In step S1203, the first uplink transmission control information and the second uplink transmission control information are transmitted to a first UE and a second UE of a user group respectively via the transceiver. Accordingly, the first UE can contend for a first subframe of the first unlicensed band radio resource pool according to the first uplink transmission control information, and the second UE can contend for a second subframe of the second unlicensed band radio resource pool according to the second uplink transmission control information.

Thereafter, in step S1205, when the first UE transmits a first reservation signal after having successfully contended for the first subframe and the first subframe is the same subframe as the second subframe, a first uplink data signal and a second uplink data signal are received in the same subframe via the transceiver. The first uplink data signal is transmitted by the first UE in the same subframe. The second uplink data signal is transmitted by the second UE in the same subframe after determining that the first reservation signal is associated with an ID of the user group.

In an embodiment, the first unlicensed band radio resource pool and the second unlicensed band radio resource pool comprise a plurality of subframes, the subframes are distributed on at least one carrier and include the first subframe and the second subframe, and each of the subframes comprises a plurality of resource block sets. Moreover, in an embodiment, the transmission control method of the present invention further comprises the following steps before the step S1201: configuring a first resource block set among the resource block sets of the same subframe so that the first UE uses the first resource block set to transmit the first uplink data signal; and configuring a second resource block set among the resource block sets of the same subframe so that the second UE uses the second resource block set to transmit the second uplink data signal. The first resource block set is different from the second resource block set.

Moreover, in an embodiment, the transmission control method of the present invention further comprises the following steps before the step S1201: receiving a first resource request message from the first UE via the transceiver so as to generate the first uplink transmission control information according to the first resource request message; and receiving a second resource request message from the second UE via the transceiver so as to generate the second uplink transmission control information according to the second resource request message.

Furthermore, in an embodiment, the transmission control method of the present invention further comprises the following step before the step S1201: receiving a pre-reservation signal from the first UE via the transceiver to generate the first uplink transmission control information according to the pre-reservation signal. The pre-reservation signal is transmitted on at least one carrier of the unlicensed band after the first UE has detected that the at least one carrier is available.

In addition to the aforesaid steps, the transmission control method of the present invention can also execute all the operations and have all the corresponding functions set forth in all the aforesaid embodiments. How this embodiment executes these operations and has these functions will be readily appreciated by those of ordinary skill in the art based on the explanation of all the aforesaid embodiments, and thus will not be further described herein.

Figure 13:
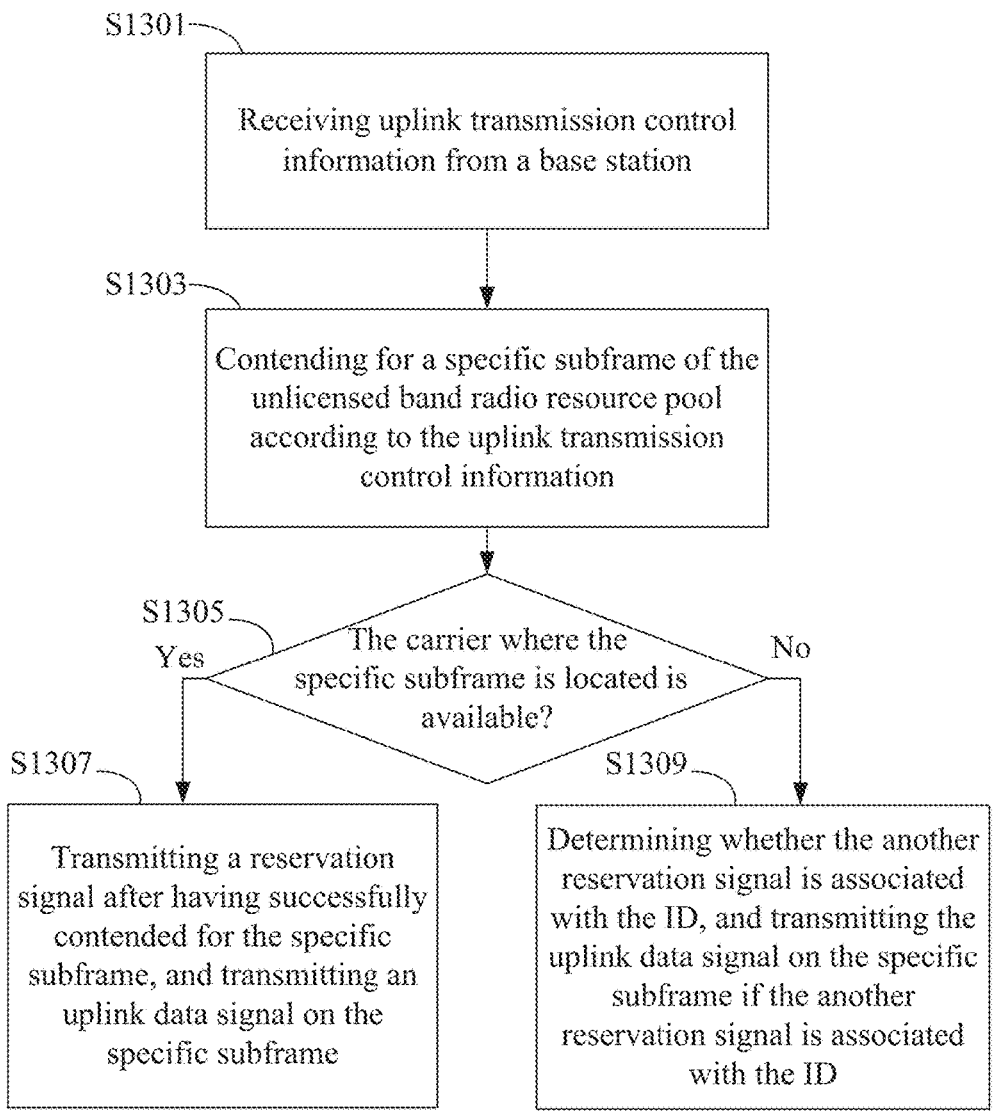
FIG. 13 is a flowchart diagram of a data transmission method of the present invention.

A ninth embodiment of the present invention is as shown in FIG. 13, which is a flowchart diagram of a data transmission method of the present invention. The data transmission method is for use in a UE, e.g., the UE 3 of the aforesaid embodiments. The UE is used in a wireless communication system, e.g., the wireless communication system WCS of the aforesaid embodiments. The UE comprises a transceiver and a processor. The processor is electrically connected to the transceiver and is configured to execute the data transmission method.

First, in step S1301, uplink transmission control information is received from a base station. The uplink transmission control information indicates an unlicensed band radio resource pool of an unlicensed band. Next, step S1303 is executed to contend for a specific subframe of the unlicensed band radio resource pool according to the first uplink transmission control information. It shall be appreciated that, the unlicensed band radio resource pool comprises a plurality of subframes, the subframes are distributed on at least one carrier and include the specific subframe, and each of the subframes comprises a plurality of resource block sets.

Next, in step S1305, it is determined whether the carrier where the specific subframe is located is available. If the carrier is clean, then it is determined that the carrier is available, and step S1307 is executed to transmit a reservation signal after having successfully contended for the specific subframe, and an uplink data signal is transmitted on the specific subframe. The reservation signal is associated with an ID of a user group to which the UE belongs. On the contrary, if another reservation signal is detected in the contention for the specific subframe, then it is determined that the carrier is unavailable; and then step S1309 is executed to determine whether the another reservation signal is associated with the ID, and the uplink data signal is transmitted on the specific subframe if it is determined that the another reservation signal is associated with the ID. For example, the ID may be one of a group ID, a cell ID, and a UE ID.

In an embodiment, the step S1303 may comprise the step of: contending for a specific subframe of the unlicensed band radio resource pool via the transceiver according to a contention priority. Moreover, in an embodiment, the data transmission method of the present invention may further comprise the following step before the step S1301: transmitting a resource request message to the base station via the transceiver so that the base station generates the uplink transmission control information according to the resource request message. Additionally, in another embodiment, the data transmission method of the present invention may further comprise the following step before the step S1301: detecting via the transceiver that at least one carrier of the unlicensed band is available, and transmitting a pre-reservation signal on the at least one carrier so that the base station generates the uplink transmission control information according to the pre-reservation signal.

In addition to the aforesaid steps, the data transmission method of the present invention can also execute all the operations and have all the corresponding functions set forth in all the aforesaid embodiments. How this embodiment executes these operations and has these functions will be readily appreciated by those of ordinary skill in the art based on the explanation of all the aforesaid embodiments, and thus will not be further described herein.

According to the above descriptions, the present invention provides an uplink transmission control mechanism to make full use of the radio resources of the unlicensed band. The base station can group UEs together and allocate each of the UEs in the group an unlicensed band radio resource pool. In a case where the unlicensed band radio resource pools of a plurality of UEs in the group have overlapped subframes therebetween, the UEs in the group can still commonly use the overlapped subframes without inter-blocking with each other. In this way, the plurality of UEs in the group can transmit uplink data signals respectively via different radio resources of the same subframe to achieve the multiplexing transmission. Accordingly, the uplink transmission control mechanism of the present invention can not only make full use of the radio resources of the unlicensed band, but also reduce the number of times of rescheduling caused by the contention failure of the UE to avoid imposing an additional burden on the base station.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station (BS) for a wireless communication system, comprising:
    a transceiver;
    a processor electrically connected to the transceiver, being configured to execute the following operations:
        generating first uplink transmission control information and second uplink transmission control information, the first uplink transmission control information indicating a first unlicensed band radio resource pool of an unlicensed band and the second uplink transmission control information indicating a second unlicensed band radio resource pool of the unlicensed band, the first unlicensed band radio resource pool and the second unlicensed band radio resource pool comprising a same subframe; and
        transmitting the first uplink transmission control information and the second uplink transmission control information to a first user equipment (UE) and a second UE of a user group respectively via the transceiver so that the first UE contends for the same subframe of the first unlicensed band radio resource pool according to the first uplink transmission control information and the second UE contends for the same subframe of the second unlicensed band radio resource pool according to the second uplink transmission control information;
    wherein when the first UE transmits a first reservation signal after having successfully contended for the same subframe, the first UE transmits a first uplink data signal in the same subframe, the second UE determines that the first reservation signal is associated with an identity (ID) of the user group so as to transmit a second uplink data signal in the same subframe, and the processor further receives the first uplink data signal and the second uplink data signal in the same subframe via the transceiver.

2. The base station of claim 1, wherein the first unlicensed band radio resource pool and the second unlicensed band radio resource pool comprise a plurality of subframes, the subframes are distributed on at least one carrier and include the same subframe, and each of the subframes comprises a plurality of resource block sets.

3. The base station of claim 2, wherein the first UE is configured to use a first resource block set among the resource block sets of the same subframe to transmit the first uplink data signal, and the second UE is configured to use a second resource block set among the resource block sets of the same subframe to transmit the second uplink data signal.

4. The base station of claim 2, wherein the first UE further contends for the subframes of the first unlicensed band radio resource pool in sequence according to a contention priority, and the second UE further contends for the subframes of the second unlicensed band radio resource pool in sequence according to another contention priority.

5. The base station of claim 2, wherein the first UE and the second UE respectively select a first resource block set and a second resource block set from the resource block sets of the same subframe according to a user priority, and use the first resource block set and the second resource block set to transmit the first uplink data signal and the second uplink data signal respectively.

6. The base station of claim 1, wherein the processor further receives a first resource request message from the first UE via the transceiver so as to generate the first uplink transmission control information according to the first resource request message, and the processor further receives a second resource request message from the second UE via the transceiver so as to generate the second uplink transmission control information according to the second resource request message.

7. The base station of claim 1, wherein the first uplink transmission control information and the second uplink transmission control information further indicate the user group.

8. The base station of claim 1, wherein the processor further generates user group information and broadcasts the user group information via the transceiver to indicate the user group.

9. The base station of claim 1, wherein the ID of the user group is selected from a group consisting of a group ID, a cell ID and a UE ID.

10. The base station of claim 1, wherein the processor further receives a pre-reservation signal from the first UE via the transceiver, and generates the first uplink transmission control information according to the pre-reservation signal, and wherein the pre-reservation signal is transmitted on at least one carrier of the unlicensed band after the first UE has detected that the at least one carrier is available.

11. A UE for a wireless communication system, comprising:
    a transceiver;
    a processor electrically connected to the transceiver, being configured to execute the following operations:
        receiving uplink transmission control information from a base station via the transceiver, the uplink transmission control information indicating an unlicensed band radio resource pool of an unlicensed band;
        contending for a specific subframe of the unlicensed band radio resource pool via the transceiver according to the uplink transmission control information;
        when the contention for the specific subframe via the transceiver succeeds, transmitting a reservation signal and transmitting on the specific subframe an uplink data signal via the transceiver, the reservation signal being associated with an ID of a user group to which the UE belongs; and when the contention for the specific subframe fails and another reservation signal is detected via the transceiver, determining whether the another reservation signal is associated with the ID, and when the another reservation signal is associated with the ID, then transmitting the uplink data signal on the specific subframe via the transceiver.

12. The UE of claim 11, wherein the unlicensed band radio resource pool comprises a plurality of subframes, the subframes are distributed on at least one carrier and include the specific subframe, and each of the subframes comprises a plurality of resource block sets.

13. The UE of claim 12, wherein the UE is configured to use a resource block set among the resource block sets of the specific subframe to transmit the uplink data signal, and another UE that transmits the another reservation signal is configured to use another resource block set among the resource block sets of the specific subframe to transmit another uplink data signal.

14. The UE of claim 13, wherein the processor further contends for the subframes of the unlicensed band radio resource pool in sequence via the transceiver according to a contention priority.

15. The UE of claim 13, wherein the UE and the another UE that transmits the another reservation signal respectively select a first resource block set and a second resource block set from the resource block sets of the specific subframe according to a user priority, and use the first resource block set and the second resource block set to transmit the uplink data signal and the another uplink data signal respectively.

16. The UE of claim 11, wherein the processor further transmits a resource request message to the base station via the transceiver so that the base station generates the uplink transmission control information according to the resource request message.

17. The UE of claim 11, wherein the uplink transmission control information further indicates the user group.

18. The UE of claim 11, wherein the processor further receives user group information from the base station via the transceiver, and the user group information indicates the user group.

19. The UE of claim 11, wherein the ID of the user group is selected from a group consisting of a group ID, a cell ID and a UE ID.

20. The UE of claim 11, wherein the processor further detects via the transceiver that at least one carrier of the unlicensed band is available, and transmits a pre-reservation signal on the at least one carrier so that the base station generates the uplink transmission control information according to the pre-reservation signal.

21. A transmission control method for a base station, the base station being used in a wireless communication system and comprising a transceiver and a processor electrically connected to the transceiver, the transmission control method being executed by the processor and the method comprising:

(a) generating first uplink transmission control information and second uplink transmission control information, the first uplink transmission control information indicating a first unlicensed band radio resource pool of an unlicensed band and the second uplink transmission control information indicating a second unlicensed band radio resource pool of the unlicensed band, the first unlicensed band radio resource pool and the second unlicensed band radio resource pool comprising a same subframe;

(b) transmitting the first uplink transmission control information and the second uplink transmission control information to a first UE and a second UE of a user group respectively via the transceiver so that the first UE contends for the same subframe of the first unlicensed band radio resource pool according to the first uplink transmission control information and the second UE contends for the same subframe of the second unlicensed band radio resource pool according to the second uplink transmission control information; and (c) when the first UE transmits a first reservation signal after having successfully contended for the same subframe, receiving a first uplink data signal and a second uplink data signal via the transceiver, wherein the first uplink data signal is transmitted by the first UE in the same subframe, and the second uplink data signal is transmitted by the second UE in the same subframe after determining that the first reservation signal is associated with an ID of the user group.

22. A data transmission method for a UE, the UE being used in a wireless communication system and comprising a transceiver and a processor electrically connected to the transceiver, the data transmission method being executed by the processor and the method comprising:

(a) receiving uplink transmission control information from a base station via the transceiver, the uplink transmission control information indicating an unlicensed band radio resource pool of an unlicensed band;

(b) contending for a specific subframe of the unlicensed band radio resource pool via the transceiver according to the uplink transmission control information;

(c) after the contention for the specific subframe via the transceiver succeeds, transmitting a reservation signal and transmitting on the specific subframe an uplink data signal via the transceiver, the reservation signal being associated with an ID of a user group to which the UE belongs; and (d) when the contention for the specific subframe fails and another reservation signal is detected via the transceiver, determining whether the another reservation signal is associated with the ID, and when the another reservation signal is associated with the ID, transmitting the uplink data signal on the specific subframe via the transceiver.

* * * * *